US012229956B2

United States Patent
Kim et al.

(10) Patent No.: US 12,229,956 B2
(45) Date of Patent: Feb. 18, 2025

(54) METHOD AND SYSTEM FOR PROCESSING CARDIOVASCULAR IMAGE FOR DETECTION OF CARDIOVASCULAR LEGIONS

(71) Applicant: Medipixel, Inc., Seoul (KR)

(72) Inventors: Hyunwoo Kim, Seoul (KR); Hwi Kwon, Seoul (KR)

(73) Assignee: Medipixel, Inc., Seoul (KR)

( * ) Notice: Subject to any disclaimer, the term of this patent is extended or adjusted under 35 U.S.C. 154(b) by 98 days.

(21) Appl. No.: 18/196,286

(22) Filed: May 11, 2023

(65) Prior Publication Data

US 2023/0368378 A1  Nov. 16, 2023

(30) Foreign Application Priority Data

May 12, 2022 (KR) .......................... 10-2022-0058291

(51) Int. Cl.
*G06K 9/00* (2022.01)
*G06T 3/40* (2006.01)
(Continued)

(52) U.S. Cl.
CPC .............. *G06T 7/0012* (2013.01); *G06T 3/40* (2013.01); *G06T 7/10* (2017.01); *G06T 7/66* (2017.01); *G06V 10/46* (2022.01); *G06V 10/761* (2022.01); *G06T 2207/30096* (2013.01); *G06T 2207/30101* (2013.01)

(58) Field of Classification Search
None
See application file for complete search history.

(56) References Cited

U.S. PATENT DOCUMENTS 10,102,633 B2 * 10/2018 Bitter ...................... G06T 7/181
11,961,276 B2 * 4/2024 Kitamura .................. G06T 7/10
(Continued)

FOREIGN PATENT DOCUMENTS

| KR | 20130018168 A | 2/2013 |
| KR | 20160103500 A | 9/2016 |
| WO | 2017047819 A1 | 3/2017 |

OTHER PUBLICATIONS

Guo et al. "Deep local-global refinement network for stent analysis in IVOCT images." International Conference on Medical Image Computing and Computer-Assisted Intervention, Sep. 23, 2019, pp. 1-8.

*Primary Examiner* — S J Park
(74) *Attorney, Agent, or Firm* — Banner & Witcoff, Ltd.

(57) ABSTRACT

A method for processing a cardiovascular image for detection of cardiovascular lesions is provided, which is performed by one or more processors of a computing device. The method includes receiving a cardiovascular image, acquiring a first image mask corresponding to at least a part of blood vessels included in the cardiovascular image, acquiring a centerline image mask corresponding to centerlines of at least the part of blood vessels included in the cardiovascular image, extracting a first image patch from the cardiovascular image, extracting a second image patch from the centerline image mask, generating a refined third image patch by performing, based on the first image patch and the second image patch, a local refinement, and generating, based on the refined third image patch and the first image mask, a refined second image mask.

16 Claims, 10 Drawing Sheets

(51) Int. Cl.
*G06T 7/00* (2017.01)
*G06T 7/10* (2017.01)
*G06T 7/66* (2017.01)
*G06V 10/46* (2022.01)
*G06V 10/74* (2022.01)

(56) References Cited

U.S. PATENT DOCUMENTS

2013/0038629 A1 2/2013 Lautenschlager et al.
2018/0055469 A1* 3/2018 Nam .......................... G06T 7/30

* cited by examiner

METHOD AND SYSTEM FOR PROCESSING CARDIOVASCULAR IMAGE FOR DETECTION OF CARDIOVASCULAR LEGIONS

CROSS-REFERENCE TO RELATED APPLICATION

This application is based on and claims priority under 35 U.S.C § 119 to Korean Patent Application No. 10-2022-0058291, filed on May 12, 2022, in the Korean Intellectual Property Office, the contents of which are incorporated herein by reference in its entirety.

TECHNICAL FIELD

The present disclosure relates to a method and system for processing cardiovascular images for detection of cardiovascular lesions, and more particularly, to a method and system for generating improved image patches for lesion candidate regions based on cardiovascular images for detection of cardiovascular lesion.

BACKGROUND

In the medical field, cardiovascular images acquired using X-ray, CT scan, cardiovascular imaging, and the like are used for diagnosis of lesions or image interpretation. In recent years, various technologies have been developed to support the detection of cardiovascular lesions using artificial neural network models based on cardiovascular images, but considering the characteristics of the medical field that deals with human life, technology that can accurately detect lesions is very important.

According to a related technique, the entire cardiovascular image is used as input data to detect main blood vessels in the cardiovascular image. Specifically, according to the related technique, a lesion region is detected by segmenting the cardiovascular image in pixel units. However, while the related technique exhibits excellent performance in distinguishing main blood vessels in the cardiovascular image, it may be difficult to process blood vessels in more detail.

SUMMARY

In order to solve one or more problems (e.g., the problems described above and/or other problems not explicitly described herein), the present disclosure provides a method for, a non-transitory computer-readable recording medium storing instructions for, and an apparatus (system) for processing a cardiovascular image for detection of cardiovascular lesions.

The present disclosure may be implemented in a variety of ways, including a method, a device (system) or a computer program stored in a readable storage medium.

A method performed by a computing device may comprise receiving a cardiovascular image, acquiring a first image mask corresponding to at least a part of blood vessels included in the cardiovascular image, acquiring a centerline image mask corresponding to centerlines of at least the part of blood vessels included in the cardiovascular image, extracting a first image patch from the cardiovascular image, extracting a second image patch from the centerline image mask, generating a refined third image patch by performing, based on the first image patch and the second image patch, a local refinement, and generating, based on the refined third image patch and the first image mask, a refined second image mask.

The generating the refined third image patch may comprise converting the second image patch into a distance map, and generating the refined third image patch by performing the local refinement based on the first image patch and the distance map.

The converting the second image patch into the distance map may comprise generating an empty image mask having the same size as the second image patch, and associating each of a plurality of pixels included in the empty image mask with information on a distance from a respective pixel of a plurality of pixels included in the second image patch to a blood vessel centerline included in the second image patch.

The information on the distance from the respective pixel of the plurality of pixels included in the second image patch to the blood vessel centerline included in the second image patch may include a value normalized such that the distance has a value between 0 and 1.

The generating the refined third image patch may comprise generating 2-channel input data by concatenating the first image patch and the distance map, and generating the refined third image patch by inputting the 2-channel input data to a local refinement model.

The local refinement model may be a model trained to perform, by performing upsampling on each of a plurality of pixels included in the training image patch and the training distance map and label(s) corresponding to each of the plurality of pixels, binary segmentation of outputting a value between 0 and 1 for each of the plurality of pixels, and convert the output value between 0 and 1 into a label.

The generating the refined second image mask may comprise generating the refined second image mask by placing the refined third image patch over the first image mask.

The generating the refined second image mask may comprise generating the refined second image mask by removing an outer region of a predetermined size from the refined third image patch and placing the refined third image patch from which the outer region is removed over an image mask of blood vessels included in the cardiovascular image.

The extracting the second image patch from the centerline image mask may comprise extracting one or more center points corresponding to a lesion candidate group from the centerlines of at least the part of blood vessels included in the centerline image mask, and extracting a patch of a predetermined size centered on each of the extracted one or more center points as the second image patch.

There is provided a non-transitory computer-readable recording medium storing instructions that cause performance of the method for processing a cardiovascular image for detection of cardiovascular lesions (e.g., by implementing one or more features and/or performing one or more operations described herein).

An information processing system is provided, which may include a memory; and one or more processors connected to the memory and configured to execute one or more computer-readable programs included in the memory, in which the one or more programs may include instructions. The instructions, when executed by the one or more processors, may cause the information processing system to receive a cardiovascular image, acquire a first image mask corresponding to at least a part of blood vessels included in the cardiovascular image, acquire a centerline image mask corresponding to centerlines of at least the part of blood vessels included in the cardiovascular image, extract a first image patch from the cardiovascular image, extract a second image patch from the centerline image mask, generate a refined third image patch by performing, based on the first image patch and the second image patch, a local refinement, and generate, based on the refined third image patch and the first image mask, a refined second image mask. The instructions, when executed by the one or more processors, may further cause the information processing system to implement one or more features and/or perform one or more operations described herein.

A method for processing a cardiovascular image for detection of cardiovascular lesions is provided, which may be performed by one or more processors. The method may comprise receiving a cardiovascular image, acquiring a first image mask corresponding to at least a part of blood vessels included in the cardiovascular image, acquiring a centerline image mask corresponding to centerlines of at least the part of blood vessels included in the cardiovascular image, extracting a first image patch from the cardiovascular image, extracting a second image patch from the centerline image mask, generating refined blood vessel contour information by performing, based on the first image patch and the second image patch, a local refinement, and generating, based on the refined blood vessel contour information and a first blood vessel contour acquired from the first image mask, a refined second blood vessel contour.

By performing local refinement on lesion candidate regions in a cardiovascular image based on the cardiovascular image, segmentation can be performed in detail in pixel units, and the accuracy of cardiovascular stenosis rate calculation can be further improved.

By concatenating an image patch corresponding to a cardiovascular image and an image patch including a blood vessel centerline or contour of a blood vessel in the cardiovascular image, and using it as the input data for local refinement, it is possible to facilitate classification of the main blood vessel region, thereby further improving the quality of cardiovascular stenosis rate calculation.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
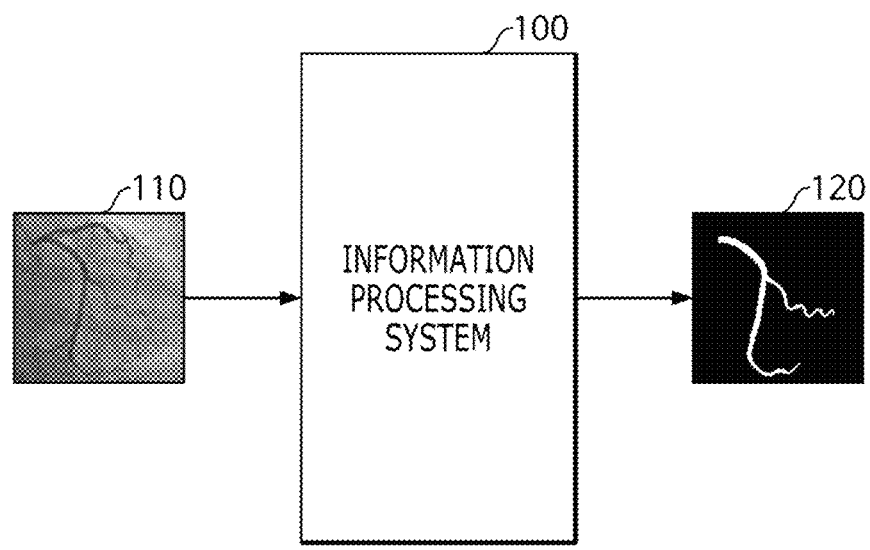
FIG. 1 is a diagram illustrating an example of a method with which an information processing system generates, based on the cardiovascular image, a refined image mask for a lesion candidate region in the cardiovascular image.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other. In still another example, the system may refer to a client device for automatically detecting a common image point (CIP) for 3D reconstruction of a cardiovascular image.

In the present disclosure, "each of a plurality of A" may refer to each of all components included in the plurality of A, or may refer to each of some of the components included in a plurality of A. For example, each of a plurality of cardiovascular images may refer to each of all images included in the plurality of cardiovascular images or each of some images included in the plurality of cardiovascular images.

A "cardiovascular image" may refer to an angiocardiogram. For example, a cardiovascular image of a patient may indicate an image captured by heart and blood vessels of the patient using angiocardiography.

An "image mask" may refer to an image obtained by masking an original image to show a specific region included in the original image.

An "image patch" may refer to an image generated using the original image, by extracting an image having a predetermined size centered on a specific region included in the original image.

A "model" may refer to a machine learning model. For example, the "model" may refer to an artificial neural network model.

FIG. 1 is a diagram illustrating an example of a method with which an information processing system 100 generates, based on a cardiovascular image 110, a refined image mask 120 for a lesion candidate region in the cardiovascular image. As illustrated in FIG. 1, the information processing system 100 may be a system provided with a service for generating a refined image mask in a cardiovascular image or a system providing a service for generating a refined image mask. For example, the information processing system 100 may generate input data of a local refinement model based on the cardiovascular image 110 and an image mask (e.g., a centerline image mask) of a centerline of a lesion candidate blood vessel generated by the cardiovascular image analysis model. In addition, the information processing system 100 may place an image patch generated by performing local refinement based on the input data over an image mask (e.g., a first image mask) for the blood vessel in the cardiovascular image, which is generated by a cardiovascular segmentation model, so as to generate a refined image mask 120 (e.g., a second image mask). In another example, the information processing system 100 may generate input data of a local refinement model based on the cardiovascular image 110 and on blood vessel contour information included in the image mask (e.g., centerline image mask) of the centerline of the lesion candidate blood vessel generated by the cardiovascular image analysis model. Further, the information processing system 100 may apply the blood vessel contour information in the image patch generated by performing the local refinement based on the input data to the image mask for blood vessel in the cardiovascular image. Specifically, the information processing system 100 may perform a correction process based on the blood vessel contour information generated by performing the local refinement based on the input data, and based on a first blood vessel contour acquired from the image mask (e.g., the first image mask) for blood vessel in the cardiovascular image generated by a cardiovascular segmentation model, so as to generate a refined second blood vessel contour.

After the cardiovascular imaging of a patient by the imaging device, the cardiovascular image 110 may be input to the information processing system 100. For example, the cardiovascular image 110 may be provided to the information processing system 100 through a computing device connected to the imaging device. As another example, the cardiovascular image 110 may be provided to the information processing system 100 through a recording medium storing the cardiovascular image 110. The method for acquiring the cardiovascular image 110 by the information processing system 100 is not limited to the example described above, and may use any other method. The cardiovascular image 110 may represent a plurality of X-ray images of a cardiovascular system of a person taken in one direction and/or in several directions through an imaging device.

The information processing system 100 may generate a patch image corresponding to the cardiovascular image based on the cardiovascular image 110 using an image patch extraction model. In addition, the information processing system 100 may generate, by using an image patch extraction model, a patch image corresponding to the image mask based on an image mask of a centerline of a lesion candidate blood vessel generated based on the cardiovascular image. The image patch extraction model may be a model trained to generate a patch image of a predetermined size based on the cardiovascular image 110 and/or the image mask. For example, the information processing system 100 may input the cardiovascular image 110 to the image patch extraction model so as to extract a corresponding image patch (e.g., first image patch) of a predetermined size. In addition, the information processing system 100 may input an image mask (e.g., centerline image mask) for the centerline of a lesion candidate blood vessel into the image patch extraction model so as to extract a corresponding image patch (e.g., a second image patch) of a predetermined size. The information processing system may generate input data for local refinement based on the first image patch and the second image patch. A specific method for this will be described below in detail with reference to FIGS. 5, 8 and 9.

The information processing system 100 may generate the refined image mask 120 based on the refined image patch generated using the local refinement model. The local refinement model may be a model trained to perform binary segmentation of performing upsampling on each of a plurality of pixels included in the training image patch and the training distance map and labels corresponding to each of the plurality of pixels so as to output a value between 0 and 1 for each of the plurality of pixels, and convert the output value between 0 and 1 into a label. For example, the information processing system 100 may input the input data for local refinement based on the first and second image patches to the local refinement model so as to generate a refined image patch (e.g., a third image patch). By placing the third image patch over the image mask (e.g., the first image mask) of blood vessels in the cardiovascular image, a refined image mask (e.g., second image mask) may be generated. The refined image patch (e.g., the third image patch) may include the blood vessel contour information. In this case, the refined second blood vessel contour may be generated by performing correction process on the first blood vessel contour in the image mask (e.g., the first image mask, and the like) of blood vessels in the cardiovascular image using the refined blood vessel contour information. In this case, the second blood vessel contour may be a mask for extracting the blood vessel contour. A specific method for this will be described below in detail with reference to FIGS. 6 and 9.

With this configuration, a high-quality image mask may be generated, which can be used for detection of a degree of occurrence of a blood vessel lesion with higher accuracy and for calculation of stenosis rate with a high reliability.

Figure 2:
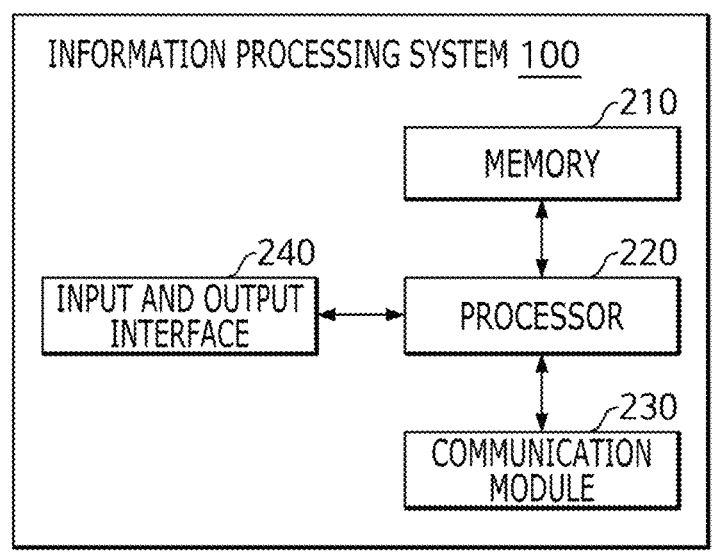
FIG. 2 is a block diagram illustrating an information processing system providing a service for processing cardiovascular image for detection of cardiovascular lesions.

FIG. 2 is a block diagram illustrating the information processing system 100 providing a service for processing cardiovascular image for detection of cardiovascular lesions. The information processing system 100 may include a memory 210, a processor 220, a communication module 230, and an input and output interface 240. As illustrated in FIG. 2, the information processing system 100 may be configured to communicate information and/or data through a network by using the communication module 230.

The memory 210 may include any non-transitory computer-readable recording medium. The memory 210 may include a permanent mass storage device such as disk drive, solid state drive (SSD), and flash memory. In another example, a non-destructive mass storage device such as ROM, SSD, flash memory, disk drive, and so on may be included in the information processing system 100 as a separate permanent storage device that is distinct from the memory. In addition, an operating system and at least one program code (e.g., computation processing of an image patch extraction model installed and driven in the information processing system 100, computation processing of a local refinement model, and so on) may be stored in the memory 210. In FIG. 2, the memory 210 is illustrated as a single memory, but this is only for convenience of description, and the memory 210 may include a plurality of memories and/or buffer memories.

These software components may be loaded from a computer-readable recording medium separate from the memory 210. Such a separate computer-readable recording medium may include a recording medium directly connectable to the information processing system 100, and may include a computer-readable recording medium such as a floppy drive, a disk, a tape, a DVD/CD-ROM drive, a memory card, and the like, for example. In another example, the software components may be loaded into the memory 210 through the communication module 230 rather than the computer-readable recording medium. For example, at least one program may be loaded into the memory 210 based on a computer program (e.g., a program or the like for transmission of data such as angiography images of cardiovascular system) installed by the files provided by the developers, or by a file distribution system that distributes an installation file of an application through the communication module 230.

The processor 220 may be configured to process the commands of the computer program by performing basic arithmetic, logic, and input and output computations. The commands may be provided to a user terminal (not illustrated) or another external system by the memory 210 or the communication module 230. For example, the processor 220 may train the image patch extraction model based on cardiovascular image training data. The image patch extraction model trained as described above may extract an image patch of a predetermined size from the cardiovascular image.

The communication module 230 may provide a configuration or function for the user terminal (not illustrated) and the information processing system 100 to communicate with each other through a network, and may provide a configuration or function for the information processing system 100 to communicate with an external system (e.g., a separate cloud system). For example, control signals, commands, data, and the like provided under the control of the processor 220 of the information processing system 100 may be transmitted to the user terminal and/or the external system through the communication module 230 and the network through the communication module of the user terminal and/or an external system. For example, the information processing system 100 may receive lesion region information extracted from an external system (e.g., a cardiovascular image segmentation system and/or cardiovascular image analysis system capable of extracting main blood vessels), centerline information of a blood vessel associated with a lesion candidate region, and the like. Alternatively, the cardiovascular image segmentation system and/or cardiovascular image analysis system capable of extracting a main blood vessel may be included in the information processing system 100.

In addition, the input and output interface 240 of the information processing system 100 may be a means for interfacing with a device (not illustrated) for inputting or outputting, which may be connected to the information processing system 100 or included in the information processing system 100. For example, the input and output interface 240 may include at least one of a PCI express interface and an Ethernet interface. In FIG. 2, the input and output interface 240 is illustrated as a component configured separately from the processor 220, but aspects are not limited thereto, and the input and output interface 240 may be configured to be included in the processor 220. The information processing system 100 may include more components than those illustrated in FIG. 2. Meanwhile, most of the related components may not necessarily require exact illustration.

The processor 220 of the information processing system 100 may be configured to manage, process, and/or store the information and/or data received from a plurality of user terminals and/or a plurality of external systems. The processor 220 may receive a cardiovascular image. The processor 220 may acquire a first image mask corresponding to at least a part of the blood vessels included in the cardiovascular image, and acquire a centerline image mask corresponding to centerlines of at least the part of blood vessels included in the cardiovascular image. In addition, the processor 220 may extract a first image patch from the cardiovascular image and extract a second image patch from the centerline image mask. The processor 220 may perform local refinement based on the first image patch and the second image patch to generate a refined third image patch. The processor 220 may generate a refined second image mask based on the refined third image patch and the first image mask. The processor 220 may receive a cardiovascular image. The processor 220 may acquire a first image mask corresponding to at least a part of blood vessels included in the cardiovascular image, and acquire a centerline image mask corresponding to centerlines of at least the part of blood vessels included in the cardiovascular image. In addition, the processor 220 may extract a first image patch from the cardiovascular image and extract a second image patch from the centerline image mask. The processor 220 may perform local refinement based on the first image patch and the second image patch to generate refined blood vessel contour information. The processor 220 may generate refined second blood vessel contour information based on the refined blood vessel contour information and the first blood vessel contour information acquired from the first image mask. In FIG. 2, the processor 220 is illustrated as a single processor, but this is only for convenience of description, and the processor 220 may include a plurality of processors.

Figure 3:
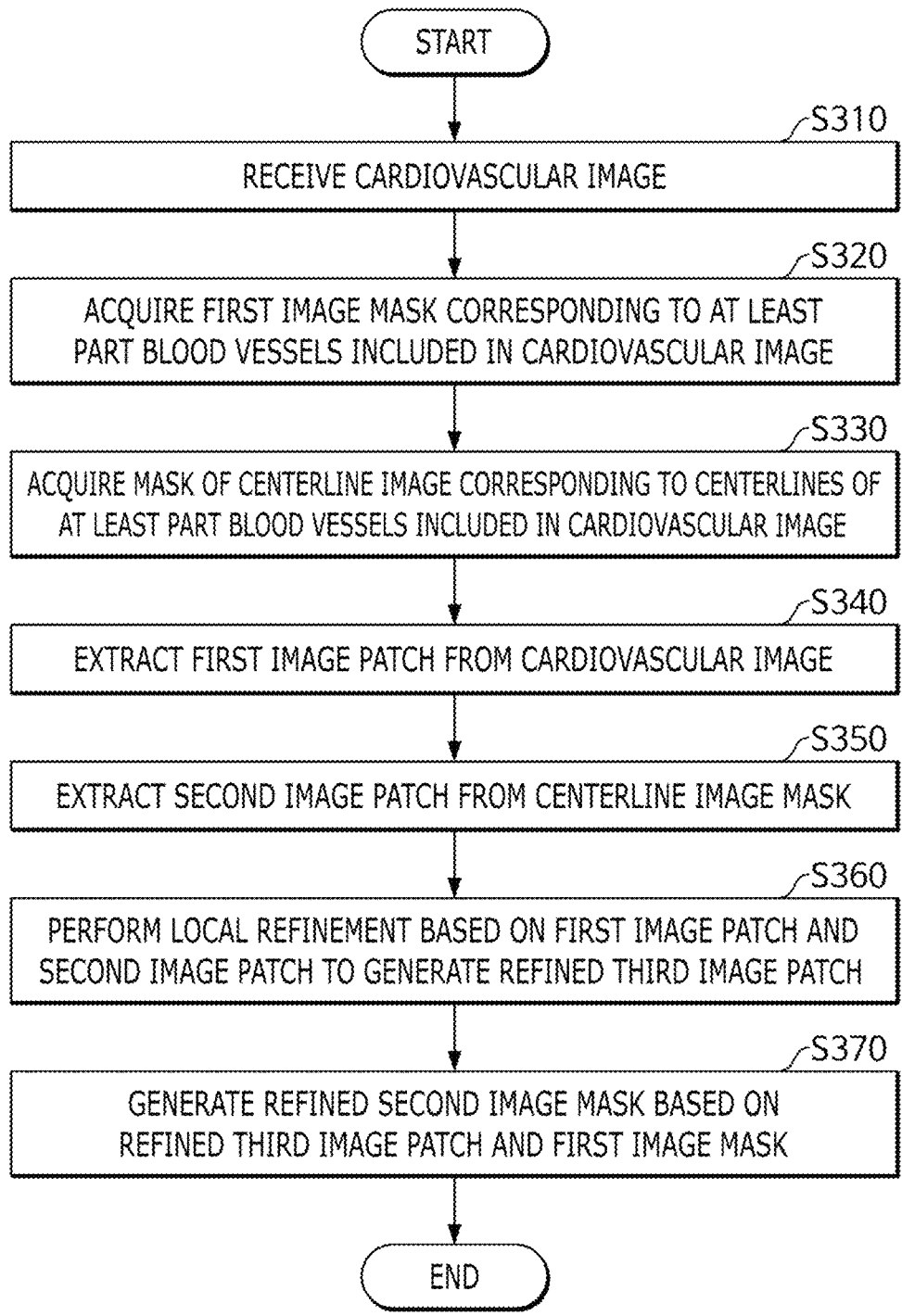
FIG. 3 is a flowchart illustrating an example of a method for processing a cardiovascular image for detection of cardiovascular lesions.

FIG. 3 is a flowchart illustrating an example of a method for processing a cardiovascular image for detection of cardiovascular lesions. The method for processing a cardiovascular image may be performed by one or more processors (e.g., the processor 220 in FIG. 2 and the like) of the information processing system. The method may be initiated by receiving a cardiovascular image, at S310.

The processor may acquire a first image mask corresponding to at least a part of blood vessels included in the cardiovascular image, at S320. For example, the processor may acquire the first image mask, that is, a segmentation mask generated by a segmentation model trained to extract a main blood vessel and branch blood vessels in the cardiovascular image using the cardiovascular image. For example, the first image mask may refer to an image in which main blood vessels and branch blood vessels are shown in the cardiovascular image and other regions are masked. The first image mask may include information associated with contours of the main blood vessels and branch blood vessels in the cardiovascular image.

The processor may acquire a centerline image mask corresponding to the centerlines of at least the part of blood vessels included in the cardiovascular image, at S330.

In this example, the centerlines of at least the part of blood vessels included in the cardiovascular image may refer to the centerlines of blood vessels estimated to be lesions. For example, the centerline image mask may refer to an image in which the centerlines of the blood vessels estimated to be a lesion is shown and other regions are masked.

The processor may extract a first image patch from the cardiovascular image, at S340. In this example, the first image patch may refer to an image patch in which a certain region is extracted in a predetermined size based on the cardiovascular image. In addition, the processor may extract a second image patch from the centerline image mask, at S350. For example, the processor may extract from the centerlines one or more center points corresponding to a lesion candidate group. The processor may extract, as the second image patch, a patch of a predetermined size centered on each of the one or more extracted center points.

The processor may perform local refinement based on the first image patch and the second image patch to generate a refined third image patch, at S360. The processor may convert the second image patch into a distance map. The processor may perform local refinement based on the first image patch and the distance map to generate a refined third image patch. For example, the processor may concatenate the first image patch and the distance map to generate 2-channel input data. For another example, the processor may generate input data of a plurality of channels including the first image patch and the distance map. For example, the processor may generate an image masked to show an outer region of the image based on the second image patch extracted from the first image mask, so as to generate a high-quality segmentation mask. The processor may concatenate the generated image with the first image patch and the distance map to generate input data of a plurality of channels. The method for generating the input data of a plurality of channels is not limited to the examples described above, and the input data may be generated in various ways.

The processor may perform local refinement based on the first image patch and the second image patch to generate refined blood vessel contour information.

In addition, the processor may input the input data of a plurality of channels to the local refinement model so as to generate a refined third image patch. The local refinement model may refer to a model trained to perform binary segmentation of performing upsampling on each of a plurality of pixels included in the training image patch and the training distance map and labels corresponding to each of the plurality of pixels so as to output a value between 0 and 1 for each of the plurality of pixels, and convert the output value between 0 and 1 into a label.

The processor may generate a refined second image mask based on the refined third image patch and the first image mask, at S370. For example, the processor may place the refined third image patch over the first image mask to generate a refined second image mask. The processor may remove an outer region of a predetermined size from the refined third image patch and place the refined third image patch from which the outer region is removed over the image mask of blood vessels included in the cardiovascular image so as to generate a refined second image mask. In another example, the processor may generate a refined second image mask based on an image mask subjected to post-processing based on the refined third image patch and the first image mask. For example, the processor may generate a refined second image mask based on an image mask obtained by subjecting the third image patch and the first image mask to post-processing such as extraction of blood vessel contour, extraction of blood vessel centerlines, and smoothing process.

The processor may generate a refined second blood vessel contour based on the refined blood vessel contour information and the first blood vessel contour acquired from the first image mask. For example, the processor may generate a refined second blood vessel contour by performing a correction process on the first blood vessel contour acquired from the first image mask using the refined blood vessel contour information.

The flowchart illustrated in FIG. 3 and the above description are merely examples, and may be implemented differently in some other examples. For example, in some examples, the order of respective steps may be changed, some steps may be repeatedly performed, some steps may be omitted, or some steps may be added.

Figure 4:
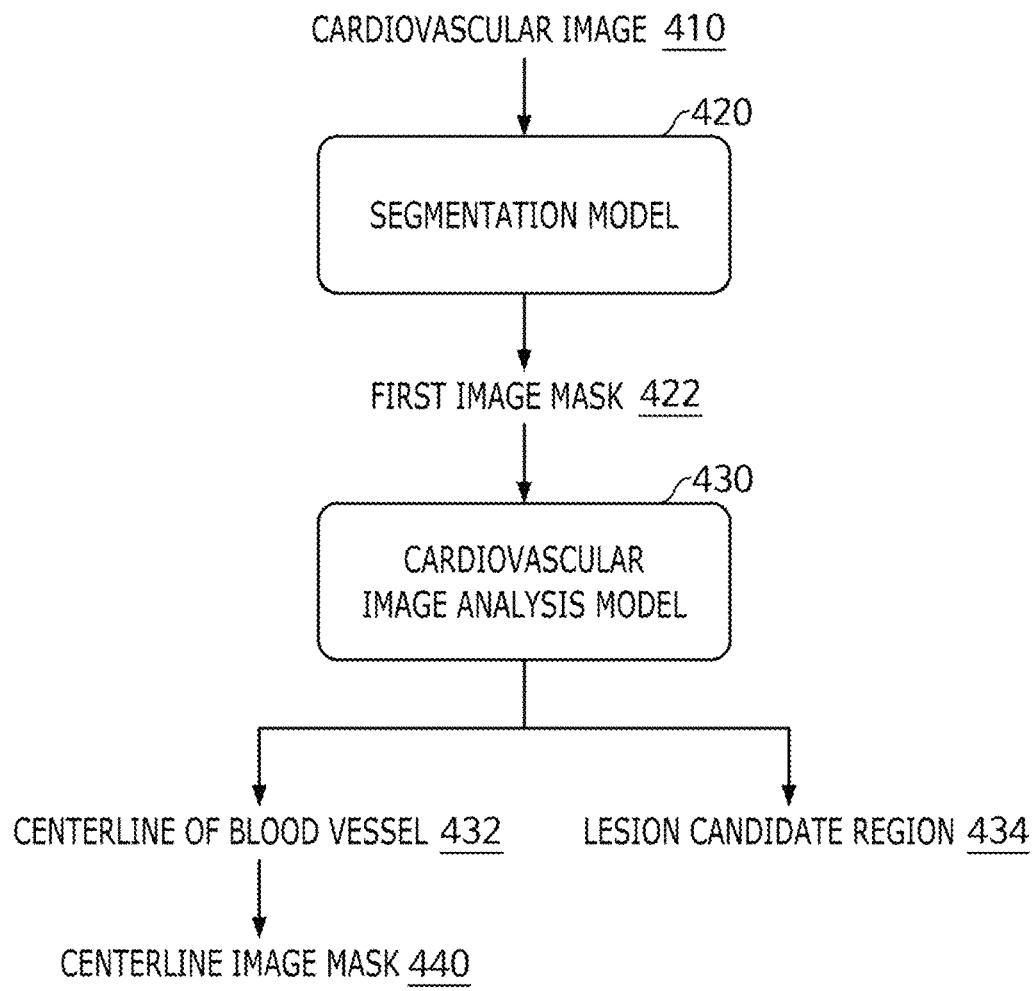
FIG. 4 is a diagram illustrating an example of a method for generating an image mask corresponding to a part of blood vessels from a cardiovascular image.

FIG. 4 is a diagram illustrating an example of a method for generating, from a cardiovascular image 410, image masks 422 and 440 corresponding to a part of blood vessels. A processor (e.g., the processor 220 in FIG. 2 or the like) may input the cardiovascular image 410 to a segmentation model 420 so as to acquire the first image mask 422 masked to show main blood vessels and branch blood vessels of a part of blood vessels included in the cardiovascular image 410. The first image mask may include information associated with contours of the main blood vessels and branch blood vessels in the cardiovascular image. The processor may acquire the centerline image mask 440 masked to show centerlines of the part of blood vessels included in the cardiovascular image 410 based on the first image mask 422. By "the part of blood vessels in the cardiovascular image 410," it may refer to blood vessels associated with the lesion candidate regions. For example, the processor may input the first image mask 422 to a cardiovascular image analysis model 430 so as to extract a blood vessel centerline 432 and a lesion candidate region 434. The processor may acquire the centerline image mask 440 masked to show centerlines of the part of blood vessels in the cardiovascular image 410 based on the extracted blood vessel centerline 432. In addition, the processor may calculate a stenosis rate (% DS) of blood vessels in the lesion candidate region 434, and if exceeding a predetermined threshold value (e.g., 0.1), determine it to be a lesion candidate group. The stenosis rate (% DS) may be calculated by A/(B−A), where A may represent the diameter of a blood vessel measured at a point where the stenosis is the most severe, and B may represent the diameter when it is assumed that stenosis is not present at the same point. The processor may generate an image patch based on the centerline image mask 440 to generate input data of the local refinement model. Details of this method will be described below with reference to FIG. 5.

The processor may generate a refined image mask by placing the refined image patch over the first image mask 422. Details of this method will be described below with reference to FIG. 6.

Figure 5:
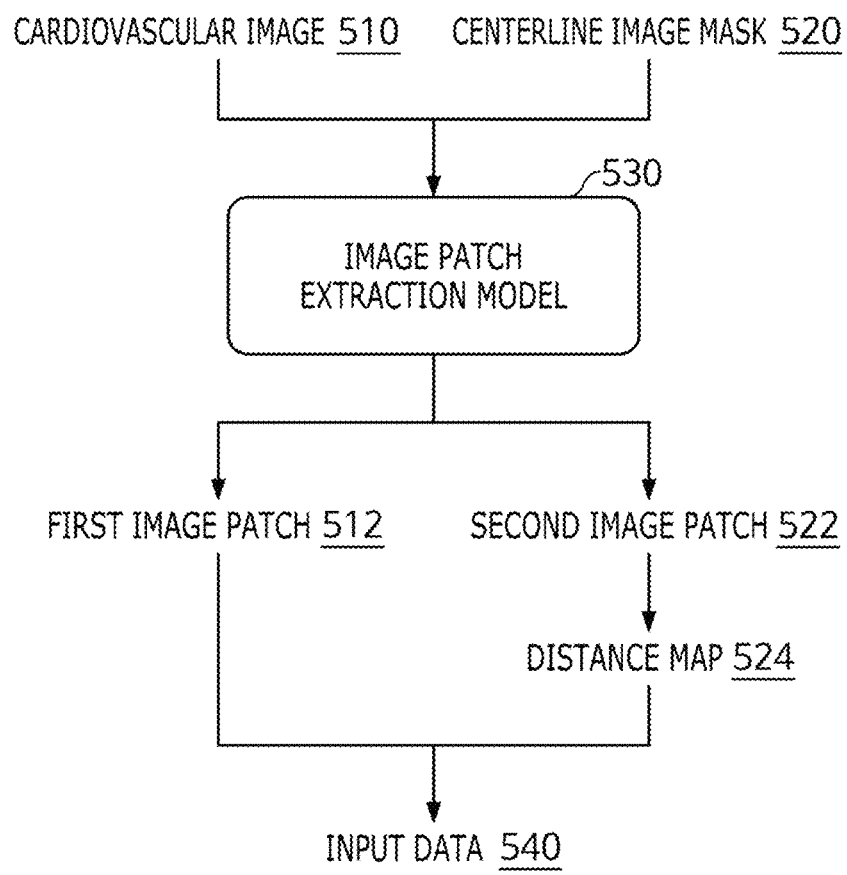
FIG. 5 is a diagram illustrating an example of a method for generating input data of a local refinement model based on a cardiovascular image and a first image mask masked to show a centerline of a part of blood vessels in the cardiovascular image.

FIG. 5 is a diagram illustrating an example of a method for generating input data 540 of a local refinement model based on a cardiovascular image 510 and a centerline image mask 520. The processor may extract a first image patch from the cardiovascular image 510. For example, the processor may input the cardiovascular image 510 to an image patch extraction model 530 so as to extract a first image patch 512 of a predetermined size. The cardiovascular image 510 may include information associated with the lesion candidate region (e.g., 434) extracted from the cardiovascular image analysis model (e.g., 430), and the first image patch 512 may represent an image patch of a predetermined size for the lesion candidate region. Additionally or alternatively, the first image patch 512 may represent a patch of a predetermined size for a blood vessel branching region.

The processor may extract a second image patch 522 from the centerline image mask 520. The centerline image mask 520 may represent an image mask masked to show the centerlines of a part of blood vessels. Specifically, the processor may input the centerline image mask 520 to the image patch extraction model 530 and extract the second image patch 522 using the centerline. For example, the processor may extract from the centerlines one or more center points corresponding to a lesion candidate group. The processor may extract, as the second image patch 522, a patch of a predetermined size centered on each of the one or more extracted center points. The image patch extraction model 530 may be a model trained to generate a patch image of a predetermined size based on cardiovascular image training data and image mask training data masked to show the centerlines of the part of blood vessels, but aspects are not limited thereto, and the image patch extraction model 530 may refer to a module that performs a function of cropping an input image to a predetermined size.

The processor may generate the input data 540 of the local refinement model based on the first image patch 512 and the second image patch 522. Specifically, the processor may concatenate a distance map 524 generated based on the first image patch 512 and the second image patch to generate the input data 540 of a plurality of channels. The distance map 524 may be generated based on information on each of a plurality of pixels included in the second image patch and the distance from each of the plurality of pixels to the blood vessel centerline in the second image patch. A method for generating the distance map 524 will be described below in detail with reference to FIG. 8.

Figure 6:
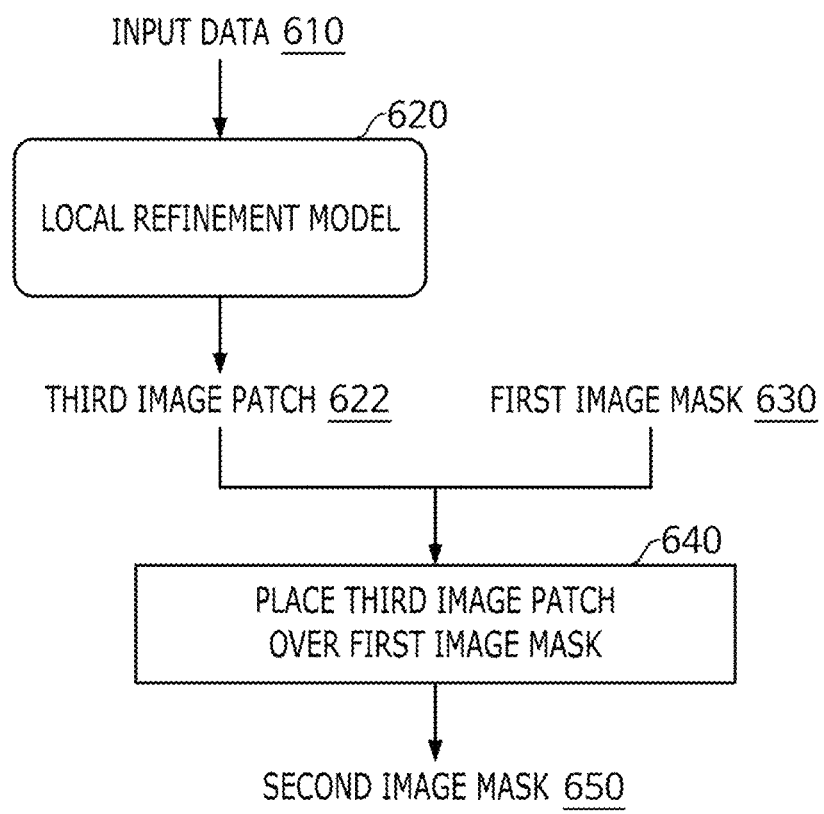
FIG. 6 is a diagram illustrating an example of a method for refining an image patch of a cardiovascular image and generating a refined image mask based on the refined image patch and an image mask masked to show blood vessels.

FIG. 6 is a diagram illustrating an example of a method for refining an image patch of a cardiovascular image and generating a refined image mask based on the refined image patch and an image mask masked to show blood vessels. The processor may generate a refined third image patch 622 by performing local refinement based on the input data (e.g., 540) of a plurality of channels generated by the method described above with reference to FIG. 5. For example, the processor may input input data 610 to a local refinement model 620 so as to generate a refined third image patch. The local refinement model 620 may be a model trained to perform binary segmentation of performing upsampling on each of a plurality of pixels included in the training image patch and the training distance map and labels corresponding to each of the plurality of pixels so as to output a value between 0 and 1 for each of the plurality of pixels, and convert the output value between 0 and 1 into a label.

The processor may generate refined blood vessel contour information by performing local refinement based on the input data (e.g., 540) of a plurality of channels generated by the method described above with reference to FIG. 5.

The processor may generate a refined second image mask 650 based on the refined third image patch 622 and a first image mask 630 masked to show main blood vessels and branch blood vessels in a cardiovascular image. For example, the processor may place the refined third image patch 622 over the first image mask 630 to generate the refined second image mask 650. Since the orientation of blood vessels in the outer region of the image patch may be inaccurate, the processor may remove an outer region of a predetermined size from the refined third image patch 622, and place the refined third image patch from which the outer region is removed over the first image mask 630 masked to show blood vessels associated with a lesion candidate in the cardiovascular image so as to generate a refined second image mask. Through this, a refined image mask for calculating the stenosis rate of a blood vessel with higher accuracy may be generated. In another example, the processor may place the refined third image patch 622 over an image mask generated by post-processing the first image mask 630 such as extraction of a blood vessel contour, extraction of a blood vessel centerline, and smoothing process, etc. so as to generate the refined second image mask 650.

The processor may generate a refined second blood vessel contour based on the refined blood vessel contour information and the first blood vessel contour acquired from the first image mask. For example, the processor may generate a refined second blood vessel contour by performing a correction process on the first blood vessel contour acquired from the first image mask using the refined blood vessel contour information.

Figure 7:
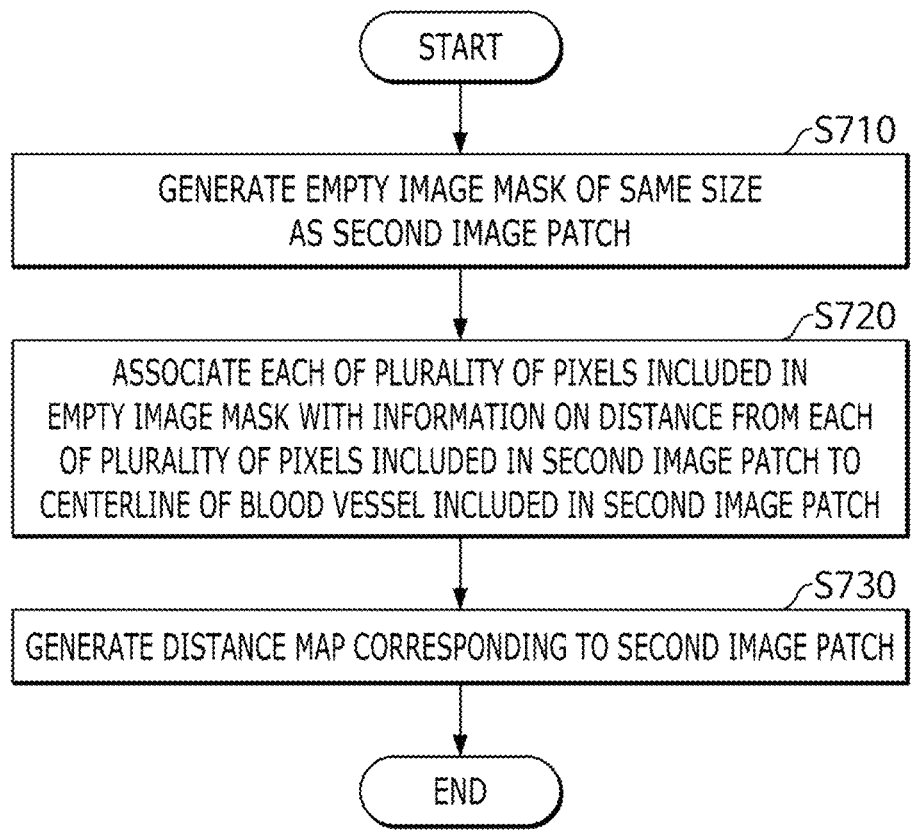
FIG. 7 is a diagram illustrating an example of a method for generating a distance map corresponding to an image patch of an image mask masked to show a centerline of the blood vessels.

FIG. 7 is a diagram illustrating an example of a method for generating a distance map corresponding to an image patch of an image mask masked to show a centerline of the blood vessels. The method for generating the distance map may be performed by one or more processors (e.g., the processor 220 in FIG. 2 and the like) of the information processing system. The processor may generate an empty image mask having the same size as the second image patch, at S710. In this example, the second image patch represents an image patch generated based on the image mask (e.g., 520) masked to show the centerline of blood vessel in the cardiovascular image. The method for generating the second image patch has been described above with reference to FIG. 5.

The processor may associate each of a plurality of pixels included in the empty image mask with information on the distance from each of a plurality of pixels included in the second image patch to the blood vessel centerline included in the second image patch, at S720. For example, the information on the distance to the blood vessel centerline included in the second image patch may refer to an L2 distance, that is, a Euclidean distance from each of the plurality of pixels included in the second image patch and each of the plurality of pixels included in the second image patch to the blood vessel centerline included in the second image patch. In addition, the information on the distance to the blood vessel centerline included in the second image patch may include a distance value normalized to have a value between 0 and 1. The processor may generate a distance map corresponding to the second image patch, at S730.

The flowchart illustrated in FIG. 7 and the above description are merely examples, and may be implemented differently in some other examples. For example, in some examples, the order of respective steps may be changed, some steps may be repeatedly performed, some steps may be omitted, or some steps may be added.

Figure 8:
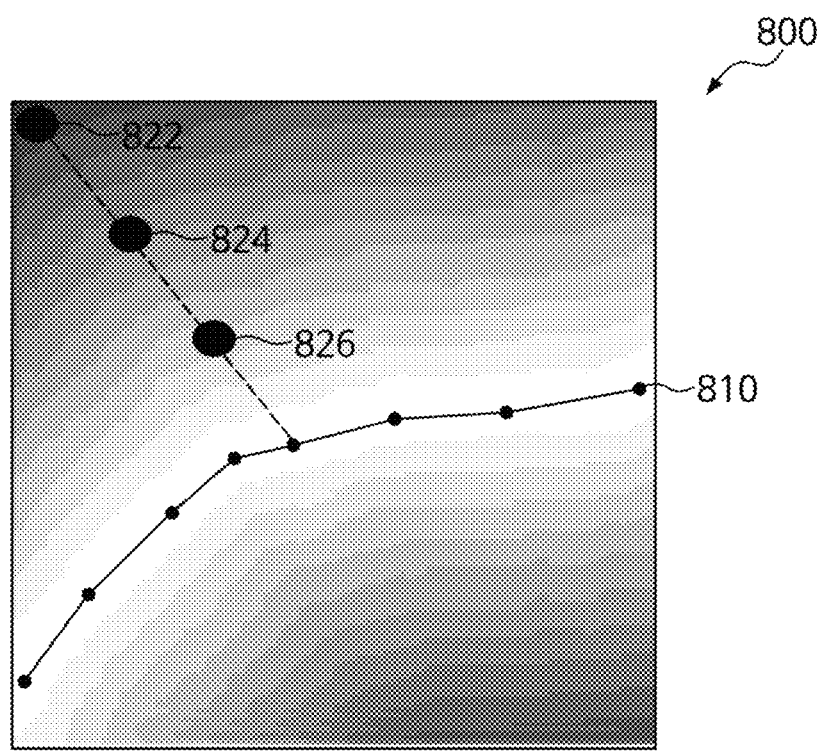
FIG. 8 is a diagram illustrating an example of a method for generating a distance map based on an image patch including a blood vessel centerline.

FIG. 8 is a diagram illustrating an example of a method for generating a distance map based on an image patch including a blood vessel centerline 810. A processor (e.g., the processor 220 in FIG. 2 or the like) may convert an image patch including the blood vessel centerline 810 into a distance map 800. The image patch (e.g., the second image patch 522 in FIG. 5) including the blood vessel centerline 810 may refer to an image patch generated based on an image mask masked to show a blood vessel centerline corresponding to a lesion candidate region included in the cardiovascular image.

Specifically, the processor may generate an empty image mask having the same size as the image patch including the blood vessel centerline 810. In addition, each of the pixels included in the empty image mask may correspond to each of the pixels included in the image patch including the blood vessel centerline 810. Since the empty image mask and the image patch have the same size, the pixels having the same pixel coordinates in the empty image mask and the image patch may correspond to each other. With this configuration, the processor may associate each of a plurality of pixels included in the empty image mask with the information on the distance from each of a plurality of pixels included in the image patch to the blood vessel centerline 810 included in the image patch.

For example, as illustrated, the processor may associate each of the plurality of pixels included in the empty image mask, for example, a first pixel 822, a second pixel 824, and a third pixel 826, with the information on the distance from each of the corresponding first pixel 822, second pixel 824, and third pixel 826 in the image patch to the nearest blood vessel centerline point included in the image patch including the blood vessel centerline 810. In this example, the distance from each of the plurality of pixels in the image patch to the blood vessel centerline may refer to the L2 distance. In addition, the information on the distance from each of the plurality of pixels to the blood vessel centerline may include a distance value normalized to have a value between 0 and 1. For example, the first pixel 822 farthest away from the blood vessel centerline may have a value close to 1, and the third pixel 826 closest to the vessel centerline may have a value close to 0.

The processor may fill each pixel included in the empty image mask with the information on the distance to the blood vessel centerline 810 so as to generate the distance map 800. As illustrated in FIG. 8, the distance map 800 in which each pixel is expressed as a value between 0 and 1 may be expressed as a gray scale image. That is, 0 may be shown in white and 1 may be shown in black. The distance map 800 generated as described above may be concatenated with the image patch (e.g., the first image patch 512 in FIG. 5) of the cardiovascular image so as to be generated as the input data of a plurality of channels for the local refinement model.

Figure 9:
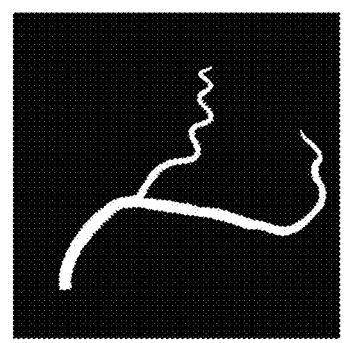
FIG. 9 is a diagram illustrating an example of a process of generating a refined image mask based on a cardiovascular image for calculating a cardiovascular stenosis rate.
Figure 9:
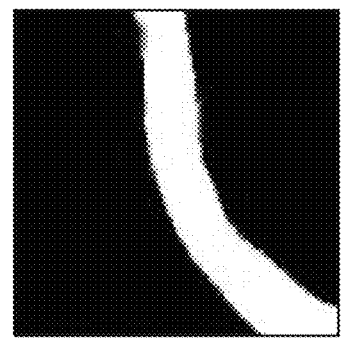
Figure 9:
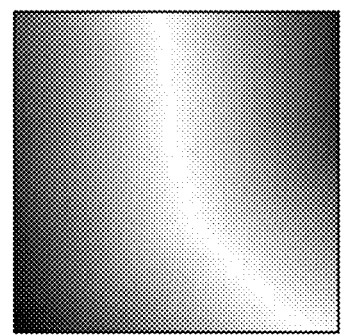
Figure 9:
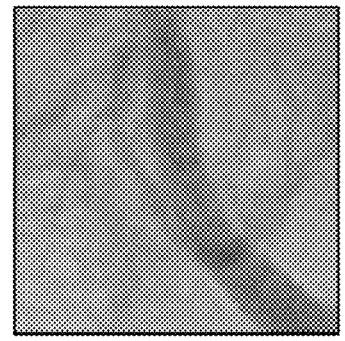

FIG. 9 is a diagram illustrating an example of a process of generating a refined image mask based on a cardiovascular image for calculating a cardiovascular stenosis rate. A processor (e.g., the processor 220 in FIG. 2 or the like) may generate input data of the local refinement model by using a distance map generated based on an image patch (e.g., the first image patch 512 in FIG. 5) corresponding to a cardiovascular image and an image patch (e.g., the second image patch 522 in FIG. 5) including a centerline of a blood vessel in the cardiovascular image. The processor may input the input data to the local refinement model so as to output a refined image patch (e.g., the third image patch 622 in FIG. 6). The processor may place the refined image patch over an image mask (e.g., the first image mask 422 in FIG. 4) masked to show blood vessels included in the cardiovascular image so as to generate the refined image mask (e.g., the second image mask 650 in FIG. 6). The refined image patch (e.g., the third image patch 622 in FIG. 6) may refer to or include refined blood vessel contour information. The processor may use the refined blood vessel contour information to correct the blood vessel contour (e.g., first blood vessel contour) acquired from the image mask (e.g., the first image mask 422 of FIG. 4) masked to show the blood vessel included in the cardiovascular image so as to generate the refined blood vessel contour (e.g., second blood vessel contour). In this case, the second blood vessel contour may be a mask for extracting the blood vessel contour.

As a specific example, a refined image mask may be generated through first to fourth states 910, 920, 930, and 940. The first state 910 shows an example of an image patch corresponding to a cardiovascular image. The image patch corresponding to the cardiovascular image may refer to an image of a predetermined size extracted from the cardiovascular image, which is centered on the lesion candidate region or the vascular branch region in the cardiovascular image.

The second state 920 shows an example of a distance map generated using an image patch including a centerline of a blood vessel in the cardiovascular image. The processor may generate a distance map by associating each pixel of an empty image mask generated based on the image patch including the centerline of the blood vessel in the cardiovascular image with the L2 distance information, that is, the Euclidean distance information from each pixel to the point of the nearest centerline in the corresponding image patch. For example, as illustrated, a pixel included in the distance map may exhibit a relatively bright shade as it approaches the centerline of the blood vessel. In contrast, the pixel may exhibit a relatively darker shade as it is farther away from the centerline of the blood vessel.

The third state 930 shows an example of a refined image patch generated by performing a local refinement on input data generated by concatenating the image patch and the distance map corresponding to the cardiovascular image. The processor may input the input data generated by concatenating the image patch and the distance map corresponding to the cardiovascular image to a local refinement model trained to perform upsampling and binary segmentation so as to generate the refined image patch. Specifically, by labeling the input data with a value between 0 and 1 through the upsampling process, the model is induced to adjust the accuracy for labeling, so that overconfidence of the model can be prevented.

The fourth state 940 shows an example of an image mask generated by placing the refined image patch over an image mask masked to show blood vessels included in the cardiovascular image. For example, as shown, the processor may generate an image mask masked to identify a diameter of a blood vessel and calculate a stenosis rate.

Figure 10:
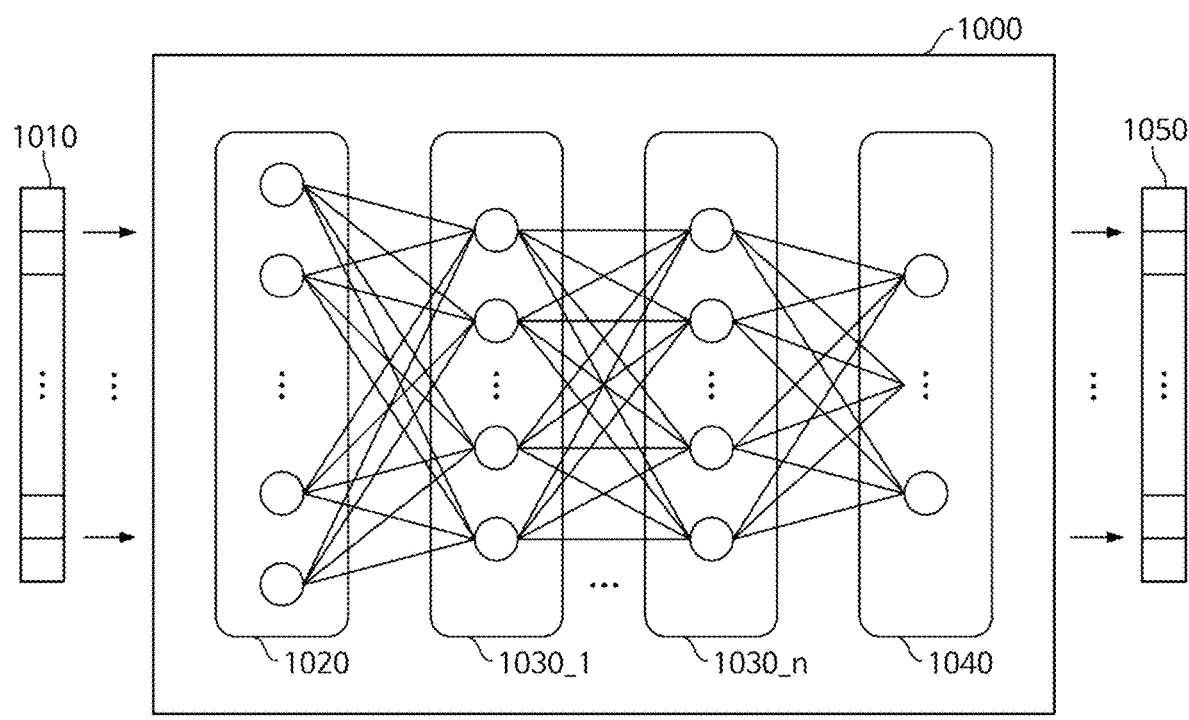
FIG. 10 illustrates an example of an artificial neural network model.

FIG. 10 illustrates an example of an artificial neural network model 1000. In machine learning technology and cognitive science, the artificial neural network model 1000 as an example of the machine learning model refers to a statistical learning algorithm implemented based on a structure of a biological neural network, or to a structure that executes such algorithm.

The artificial neural network model 1000 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 1000 may include any probability model, neural network model, and the like, that is used in artificial intelligence training methods such as machine learning and deep learning.

The segmentation model, cardiovascular image analysis model, image patch extraction model, and local refinement model described above may be generated in the form of the artificial neural network model 1000. For example, the artificial neural network model 1000 may receive a cardiovascular image and extract a main blood vessel and a branch blood vessel in the cardiovascular image. As another example, the artificial neural network model 1000 may receive a cardiovascular image, determine a lesion candidate region in the cardiovascular image, and extract a blood vessel centerline. As another example, the artificial neural network model 1000 may receive a cardiovascular image and generate an image patch of a predetermined size centered on a lesion candidate region or a blood vessel branch region in the received cardiovascular image. In addition, the artificial neural network model 1000 may receive an image mask masked to show a centerline of the blood vessel included in the cardiovascular image, and generate an image patch of a predetermined size centered on a lesion candidate region in the cardiovascular image. As another example, the artificial neural network model 1000 may receive input data generated by concatenating an image patch and a distance map corresponding to the cardiovascular image, and perform local refinement so as to generate a refined image patch.

The artificial neural network model 1000 is implemented as a multilayer perceptron (MLP) formed of multiple nodes and connections between them. The artificial neural network model 1000 may be implemented using one of various artificial neural network model structures including the MLP. As illustrated in FIG. 10, the artificial neural network model 1000 includes an input layer 1020 to receive an input signal or data 1010 from the outside, an output layer 1040 to output an output signal or data 1050 corresponding to the input data, and (n) number of hidden layers 1030_1 to 1030_n (where n is a positive integer) positioned between the input layer 1020 and the output layer 1040 to receive a signal from the input layer 1020, extract the features, and transmit the features to the output layer 1040. In an example, the output layer 1040 receives signals from the hidden layers 1030_1 to 1030_n and outputs them to the outside.

The method of training the artificial neural network model 1000 includes the supervised learning that trains to optimize for solving a problem with inputs of teacher signals (correct answers), and the unsupervised learning that does not require a teacher signal. The information processing system may train the artificial neural network model 1000 using a plurality of cardiovascular images of the cardiovascular system.

The information processing system may directly generate the training data for training the artificial neural network model 1000. For example, the information processing system may generate a training data set including cardiovascular images. Based on the generated training data set, the information processing system may train the artificial neural network model 1000 for extracting main blood vessels and branch blood vessels included in the cardiovascular image. In another example, the information processing system may generate a training data set including cardiovascular images.

The information processing system may train the artificial neural network model 1000 for extracting the lesion candidate region and the centerline of the blood vessel included in the cardiovascular image based on the generated training data set. In another example, the information processing system may receive a cardiovascular image and generate a training data set including an image patch of a predetermined size centered around a lesion candidate region included in the cardiovascular image. The information processing system may train the artificial neural network model 1000 for generating an image patch of a predetermined size generated around the lesion candidate region included in the cardiovascular image based on the generated training data set. In another example, the information processing system may generate a training data set including data generated by concatenating an image patch and a distance map corresponding to the cardiovascular image. The information processing system train the artificial neural network model 1000 to perform binary segmentation of performing upsampling on each of a plurality of pixels included in the generated training data set (e.g., a training image patch and a training distance map) and labels corresponding to each of a plurality of pixels so as to output a value between 0 and 1 for each of the plurality of pixels, and convert the output value between 0 and 1 into a label.

An input variable of the artificial neural network model 1000 may include a cardiovascular image. If the input variables described above are input through the input layer 1020, an output variable output from the output layer 1040 of the artificial neural network model 1000 may be an image in which main blood vessels and branch blood vessels are extracted from the cardiovascular image, and an image in which a lesion candidate region, a blood vessel contour, and/or a blood vessel centerline are extracted from the cardiovascular image. According to another example, the input variable of the artificial neural network model 1000 may include a cardiovascular image. Additionally, the input variable of the artificial neural network model 1000 may include an image mask masked to show a centerline of the blood vessel included in the cardiovascular image. As described above, if the input variable described above is input through the input layer 1020, the output variable output from the output layer 1040 of the artificial neural network model 1000 may be an image patch of a predetermined size centered on a lesion candidate region in the cardiovascular image. In still another example, the input variable of the artificial neural network model 1000 may include a training data set and the like including data generated by concatenating an image patch and a distance map corresponding to the cardiovascular image. If the input variable described above is input through the input layer 1020, the output variable output from the output layer 1040 of the artificial neural network model 1000 may be a refined image patch by the binary segmentation of upsampling the input data and labeling with a value between 0 and 1.

As described above, the input layer 1020 and the output layer 1040 of the artificial neural network model 1000 are respectively matched with a plurality of output variables corresponding to a plurality of input variables, and as the synaptic values between nodes included in the input layer 1020, and the hidden layers 1030_1 to 1030_n, and the output layer 1040 are adjusted, training can be processed to extract a correct output corresponding to a specific input. Through this training process, the features hidden in the input variables of the artificial neural network model 1000 can be confirmed, and the synaptic values (or weights) between the nodes of the artificial neural network model 1000 can be adjusted so that there can be a reduced error between the target output and the output variable calculated based on the input variable. Using the artificial neural network model 1000 trained as described above, the main blood vessels and the branch blood vessels included in the received cardiovascular image may be extracted. In addition, using the trained artificial neural network model 1000, the centerline of the blood vessel and lesion candidate regions included in the received cardiovascular image may be extracted. In addition, using the trained artificial neural network model 1000, an image patch associated with the received cardiovascular image and/or the image mask masked to show a centerline of the blood vessel (or contour of the blood vessel) included in the cardiovascular image may be generated. In addition, using the trained artificial neural network model 1000, a refined image patch obtained by performing a local refinement on data generated by concatenating an image patch and a distance map corresponding to the cardiovascular image may be generated.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method performed by a computing device, the method comprising:
   receiving a cardiovascular image;
   acquiring a first image mask corresponding to at least a part of blood vessels included in the cardiovascular image;
   acquiring a centerline image mask corresponding to centerlines of at least the part of blood vessels included in the cardiovascular image;
   extracting a first image patch from the cardiovascular image;
   extracting a second image patch from the centerline image mask;
   generating a refined third image patch by performing, based on the first image patch and the second image patch, a local refinement; and
   generating, based on the refined third image patch and the first image mask, a refined second image mask,
   wherein the generating the refined third image patch comprises:
     converting the second image patch into a distance map; and
     generating the refined third image patch by performing the local refinement based on the first image patch and the distance map.

2. The method according to claim 1, wherein the converting the second image patch into the distance map comprises:
   generating an empty image mask having a same size as the second image patch; and
   associating each of a plurality of pixels included in the empty image mask with information on a distance from a respective pixel of a plurality of pixels included in the second image patch to a blood vessel centerline included in the second image patch.

3. The method according to claim 2, wherein the information on the distance from the respective pixel of the plurality of pixels included in the second image patch to the blood vessel centerline included in the second image patch includes a value normalized such that the distance has a value between 0 and 1.

4. The method according to claim 1, wherein the generating the refined third image patch comprises:
   generating 2-channel input data by concatenating the first image patch and the distance map; and generating the refined third image patch by inputting the 2-channel input data to a local refinement model.

5. The method according to claim 4, wherein the local refinement model is a model trained to:
perform, by performing upsampling on each of a plurality of pixels included in a training image patch and a training distance map and a label corresponding to each of the plurality of pixels, binary segmentation of outputting a value between 0 and 1 for each of the plurality of pixels, and
convert the output value between 0 and 1 into a label.

6. The method according to claim 1, wherein the generating the refined second image mask comprises generating the refined second image mask by placing the refined third image patch over the first image mask.

7. The method according to claim 1, wherein the generating the refined second image mask comprises generating the refined second image mask by:
removing an outer region of a predetermined size from the refined third image patch; and
placing the refined third image patch, from which the outer region is removed, over an image mask of blood vessels included in the cardiovascular image.

8. The method according to claim 1, wherein the extracting the second image patch from the centerline image mask comprises:
extracting one or more center points corresponding to a lesion candidate group from the centerlines of at least the part of blood vessels included in the centerline image mask; and
extracting a patch of a predetermined size centered on each of the extracted one or more center points as the second image patch.

9. An information processing system, comprising:
a communication module;
one or more processors; and
a memory storing instructions that, when executed by the one or more processors, cause the information processing system to:
receive a cardiovascular image;
acquire a first image mask corresponding to at least a part of blood vessels included in the cardiovascular image;
acquire a centerline image mask corresponding to centerlines of at least the part of blood vessels included in the cardiovascular image;
extract a first image patch from the cardiovascular image;
extract a second image patch from the centerline image mask;
generate a refined third image patch by performing, based on the first image patch and the second image patch, a local refinement; and
generate, based on the refined third image patch and the first image mask, a refined second image mask, and
wherein the instructions, when executed by the one or more processors, cause the information processing system to:
convert the second image patch into a distance map; and
generate the refined third image patch by performing the local refinement based on the first image patch and the distance map.

10. The information processing system according to claim 9, wherein the instructions, when executed by the one or more processors, cause the information processing system to convert the second image patch into a distance map by:
generating an empty image mask having a same size as the second image patch; and
associating each of a plurality of pixels included in the empty image mask with information on a distance from a respective pixel of a plurality of pixels included in the second image patch to a blood vessel centerline included in the second image patch.

11. The information processing system according to claim 10, wherein the information on the distance from the respective pixel of the plurality of pixels included in the second image patch to the blood vessel centerline included in the second image patch includes a value normalized such that the distance has a value between 0 and 1.

12. The information processing system according to claim 9, wherein the instructions, when executed by the one or more processors, cause the information processing system to generate the refined third image patch by:
generating 2-channel input data by concatenating the first image patch and the distance map; and
generating the refined third image patch by inputting the 2-channel input data to a local refinement model.

13. The information processing system according to claim 12, wherein the local refinement model is a model trained to perform, by performing upsampling on each of a plurality of pixels included in a training image patch and a training distance map and a label corresponding to each of the plurality of pixels, binary segmentation of outputting a value between 0 and 1 for each of the plurality of pixels, and convert the output value between 0 and 1 into a label.

14. The information processing system according to claim 9, wherein the instructions, when executed by the one or more processors, cause the information processing system to generate the refined second image mask by generating the refined second image mask by placing the refined third image patch over the first image mask.

15. The information processing system according to claim 9, wherein the instructions, when executed by the one or more processors, cause the information processing system to generate the refined second image mask by:
removing an outer region of a predetermined size from the refined third image patch; and
placing the refined third image patch, from which the outer region is removed, over an image mask of blood vessels included in the cardiovascular image.

16. The information processing system according to claim 9, wherein the instructions, when executed by the one or more processors, cause the information processing system to extract a second image patch from the centerline image mask by:
extracting one or more center points corresponding to a lesion candidate group from the centerlines of at least the part of blood vessels included in the centerline image mask; and
extracting a patch of a predetermined size centered on each of the extracted one or more center points as the second image patch.

* * * * *